April 15, 1958   J. T. CUSICK   2,830,741
FUEL TANK HOLDER MECHANISM FOR FUEL PUMPS
Filed Sept. 24, 1956
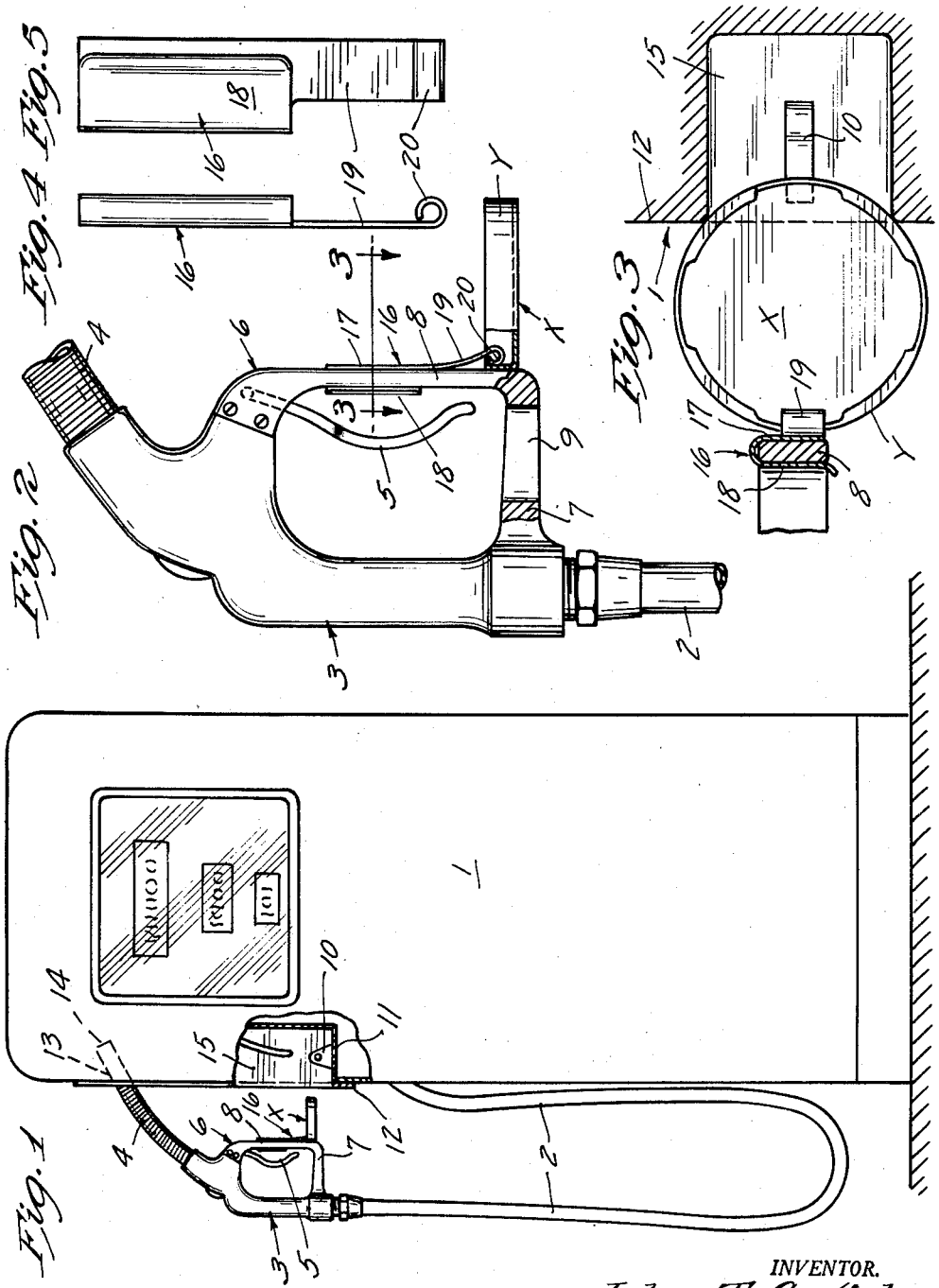
INVENTOR.
John T. Cusick
BY
Merchant & Merchant
ATTORNEYS United States Patent Office 2,830,741
Patented Apr. 15, 1958

2,830,741

FUEL TANK HOLDER MECHANISM FOR FUEL PUMPS

John T. Cusick, Minneapolis, Minn.

Application September 24, 1956, Serial No. 611,510

2 Claims. (Cl. 222—192)

My invention relates generally to power operated pumps for dispensing of petroleous fuel, such as gasoline, and more particularly to means, associated with the nozzle-equipped discharge valve, for holding the filler-cap of an automotive vehicle gas tank during the filling thereof in a manner to substantially assure replacement of the cap upon the tank after said filling.

One of the most common problems of the filling station attendant is the failure of himself or his employees to replace the filler-caps on the fuel tanks of automotive vehicles after filling with gasoline or the like. This is due to the fact that the cap is removed and alternatively placed either in the pocket of the attendant or some place upon the filler-pump or vehicle while the attendant washes windshields, etc.

Substantially all modern power operated gasoline pumps today are provided with and include a housing for a power operated dispensing pump, a discharge conduit or hose, a manually operated nozzle-equipped discharge valve on the end of said hose, and means providing a seat for supporting said discharge valve associated with the outer wall surface of said housing, said discharge valve having a manually operated valve control element and an angular guard frame partially encompassing said control element, a portion of said guard frame providing a base engageable with said seat to detachably support said valve in a storage position.

The primary object of my invention is to provide a resilient tongue carried by said guard frame angularly spaced from said base, said tongue overlying said angularly spaced portion of said guard frame and having a head on its outer end yieldingly urged against an underlying portion of said guard frame, said head adapted to engage the filler-cap of an automotive vehicle, and in cooperation with the underlying portion of said guard frame to support said cap in a position to prevent normal engagement of said base with said seat. By this arrangement the filling station operator is forced to remove the filler-cap from between the resilient tongue and the base of the guard frame before the nozzle-equipped discharge valve can be returned to its normal storage position on said seat.

A further object of my invention is the provision of a device of the class described wherein the resilient tongue and the head thereof is adapted to engage the marginal flange of the filler-cap and support said filler-cap in a forwardly extended position generally parallel to the base of said guard frame.

A still further object of my invention is the provision of attachment means for conventional gasoline pumps of the type immediately above described.

A further object of my invention is the provision of a device of the class described which is relatively inexpensive to produce, which is rugged and durable, and which is substantially fool-proof in its operation.

The above and still further objects of my invention will become apparent from the following detailed specification, appended claims, and attached drawings.

Referring to the drawings, wherein like parts are indicated by like characters throughout the several views:

Fig. 1 is a view in front elevation of a conventional gasoline pump incorporating my invention, some parts being broken away and some parts shown in section.

Fig. 2 is an enlarged fragmentary view of the nozzle-equipped discharge valve illustrating my invention, some parts being broken away and some parts shown in section;

Fig. 3 is an enlarged sectional view taken substantially on the line 3—3 of Fig. 2, and illustrating how a gasoline tank filler-cap when temporarily held by my novel combination and arrangement of parts prevents the returning of the discharge valve to its storage position;

Fig. 4 is an enlarged view in side elevation of an attachment clip constructed in accordance with my invention; and Fig. 5 is a view in top plan of the structure of Fig. 4.

Referring with greater particularity to the drawings, the numeral 1 indicates a box-like housing for a power operated dispensing pump, the numeral 2 a flexible discharge conduit or hose, and the numeral 3 indicates in its entirety a manually operated discharge device having a flexible nozzle 4 at its outer end. A control element 5, as shown in the nature of a manually operated lever, is provided for the discharge valve. The details of construction of the discharge valve form no part of the instant invention and, hence, will not be explained in detail. It suffices to state that such parts are of conventional design.

The substantially L-shaped guard frame 6 cooperates with the valve body to encompass the valve control element 5, the guard frame 6 partially encompassing said control element. Guard frame 6 is divided into a base portion 7 and an angular portion 8. As shown in Fig. 2, the base portion 7 is provided with a vertical slot 9 therethrough which is adapted to receive a relatively narrow locking lug 10 mounted on a seat 11 carried by the housing 1 in closely spaced relation to a side wall 12 thereof.

Preferably and as shown, the side wall 12 is provided with an opening 13 in its upper portion for the snug reception of the free end 14 of the flexible nozzle 4. Below the opening 13 the wall 12 is provided with a relatively narrow vertically extended slot 15 which is adapted to receive the guard frame 6 so as to permit the base 7 thereof to come to rest upon the seat 11, with the locking lug 10 projecting upwardly through the opening 9, for the purpose of storage during disuse. It will be noted that the transverse width of the slot 15 is such as to freely receive the guard frame 6 but to definitely exclude therefrom a conventional gasoline tank filler-cap X when the plane of the flat top of said cap is disposed transversely of the longitudinal dimension of the slot 15, see Fig. 3. The significance of this will hereinafter become apparent.

Preferably and as shown, being formed from a single sheet of resilient metal or the like, is a clip element identified in its entirety by the numeral 16. The upper end of the clip element 16 is bent backward upon itself in U-shape to provide resilient jaws 17 and 18 adapted to frictionally receive therebetween the intermediate portion of the angular portion 8 of the guard frame 6. A resilient tongue propects outwardly from the clip element 16 and is provided at its outer end with a head 20, preferably and as shown formed by rolling the free end of the tongue 19 downwardly in generally circular form. The head 20 is adapted to be yieldingly urged aaginst an underlying portion of the guard fruame 6, preferably and as shown in spaced relation to the base 7 thereof. The head 20 is adapted to receive therebetween and the underlying portion of the guard frame 6 the marginal flange Y of the filler-cap X of an automotive vehicle fuel tank or the like whereby to support said cap X in a position generally parallel to the base 7 and with the plane thereof, as shown in Fig. 3, at right angles to the longitudinal dimensions of the slot 15.

With the above novel combination and arrangement of parts, once the operator gets into the habit of inserting the filler-cap X between the head 20 and the underlying portion of the guard frame 6, after removal of the cap X from the tank of an automotive vehicle to be filled (as shown in Figs. 2 and 3), said cap X will be safely retained in such position during the filling operation. Thereafter the station operator will have an ample reminder to replace filler-cap X upon the automotive vehicle gas tank from which it was removed due to the fact that the nozzle-equipped discharge valve cannot be placed back into its normal operative position, with the base 7 of the guard frame 6 seated upon the seat 11.

My invention has been thoroughly tested and found to be completely satisfactory for the accomplishment of the above objects, and while I have disclosed a preferred embodiment thereof, it should be obvious that same is capable of modification without departure from the scope of the appended claims.

What I claim is:

1. In a device of the class described, a housing for a power operated dispensing pump, a discharge conduit, a manually operated nozzle-equipped discharge device, and means providing a seat for supporting said discharge device adjacent an outer wall surface of said housing, said discharge device having a manually operated control element and an angular guard frame partially encompassing said control element, a portion of said guard frame providing a base engageable with said seat to detachably support said device in a storage position, and a resilient tongue carried by said guard frame angularly spaced from said base, said tongue overlying said angularly spaced portion of said guard frame and having a head on its outer end yieldingly urged against an underlying portion of said guard frame, said head adapted to engage a portable fuel tank filler-cap and cooperating with said underlying portion of said guard frame to support said cap in a position preventing normal engagement of said base with said seat.

2. The structure defined in claim 1 in which said head is adapted to engage the marginal flange of said filler-cap and support said filler-cap generally parallel to said base.

References Cited in the file of this patent

UNITED STATES PATENTS

| | | |
|---|---|---|
| 682,269 | Poe | Sept. 10, 1901 |
| 828,158 | Weaver | Aug. 7, 1906 |